United States Patent
Xiao

(10) Patent No.: US 10,795,204 B2
(45) Date of Patent: Oct. 6, 2020

(54) FLEXIBLE LIQUID CRYSTAL DISPLAY MODULE FOR DOUBLE-SIDE DISPLAY

(71) Applicant: WUHAN CHINA STAR OPTOELECTRONICS TECHNOLOGY CO., LTD., Wuhan, Hubei (CN)

(72) Inventor: Shiyuan Xiao, Hubei (CN)

(73) Assignee: WUHAN CHINA STAR OPTOELECTRONICS TECHNOLOGY CO., LTD., Wuhan, Hubei (CN)

(*) Notice: Subject to any disclaimer, the term of this patent is extended or adjusted under 35 U.S.C. 154(b) by 0 days.

(21) Appl. No.: 16/462,228

(22) PCT Filed: Nov. 23, 2018

(86) PCT No.: PCT/CN2018/117203
§ 371 (c)(1),
(2) Date: May 19, 2019

(87) PCT Pub. No.: WO2020/037857
PCT Pub. Date: Feb. 27, 2020

(65) Prior Publication Data
US 2020/0209658 A1    Jul. 2, 2020

(30) Foreign Application Priority Data
Aug. 22, 2018   (CN) .......................... 2018 1 0959388

(51) Int. Cl.
*G02F 1/13357*    (2006.01)
*G02F 1/1333*    (2006.01)
(Continued)

(52) U.S. Cl.
CPC ...... *G02F 1/1336* (2013.01); *G02F 1/133305* (2013.01); *G02F 1/133514* (2013.01);
(Continued)

(58) Field of Classification Search
CPC ......... G02F 1/133603; G02F 1/133615; G02F 1/133305; G02F 1/1336; G02F 1/133514;
(Continued)

(56) References Cited

U.S. PATENT DOCUMENTS

2007/0222742 A1* 9/2007 Kimura ................ G09G 3/3611
345/102
2010/0246160 A1* 9/2010 Ito ..................... G02F 1/133603
362/84
(Continued)

*Primary Examiner* — Charles S Chang
(74) *Attorney, Agent, or Firm* — Mark M. Friedman

(57) ABSTRACT

A flexible liquid crystal display (LCD) module for double-side display includes a flexible substrate, a first blue light emitting diode (LED) set and a second blue LED set arranged on the flexible substrate. A first yellow phosphor layer and a second yellow phosphor layer are arranged on the first blue LED set and the second blue LED set, respectively. A first flexible LCD panel and a second flexible LCD panel are combined with the flexible substrate through a first fixing material and a second fixing material, respectively. The LCD module is fabricated by flexible material. The first and second flexible LCD panels display identical or different images simultaneously.

9 Claims, 1 Drawing Sheet

(51) Int. Cl.
 *G02F 1/1335* (2006.01)
 *G02F 1/1362* (2006.01)
(52) U.S. Cl.
 CPC ............... *G02F 1/133528* (2013.01); *G02F 2001/133614* (2013.01); *G02F 2001/136222* (2013.01)
(58) Field of Classification Search
 CPC ... G02F 1/133528; G02F 2001/133614; G02F 2001/136222; G02B 6/0025
 USPC .................................................. 349/71, 74
 See application file for complete search history.

(56) References Cited

U.S. PATENT DOCUMENTS

| | | | |
|---|---|---|---|
| 2013/0120967 A1* | 5/2013 | Liao | ............... H01L 33/486 362/97.1 |
| 2016/0238892 A1* | 8/2016 | Liu | ............... G02B 5/201 |
| 2018/0004039 A1* | 1/2018 | Kim | ............... G02F 1/133603 |
| 2019/0016926 A1* | 1/2019 | Park | ............... C08J 5/18 |
| 2019/0025621 A1* | 1/2019 | Shin | ............... G02F 1/1339 |

* cited by examiner

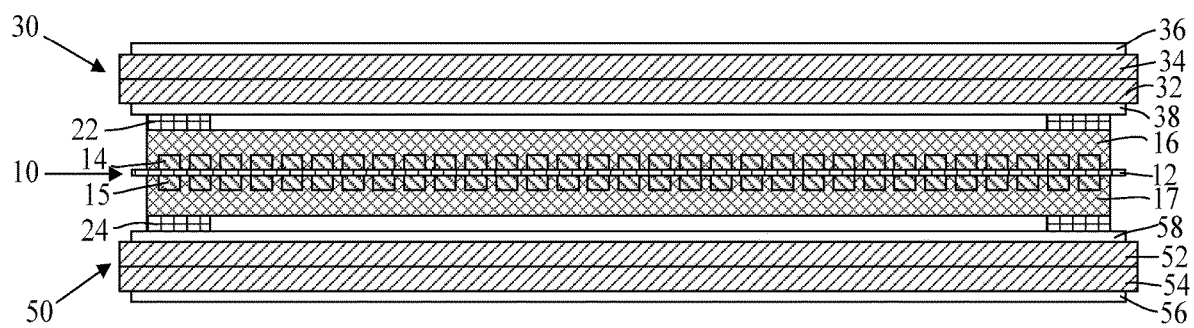

FLEXIBLE LIQUID CRYSTAL DISPLAY MODULE FOR DOUBLE-SIDE DISPLAY

BACKGROUND

1. Field of the Disclosure

The present disclosure relates to the field of liquid crystal display (LCD) technology, and more particularly, to an LCD module for double-side display.

2. Description of the Related Art

With the development of liquid crystal display (LCD) technology, an LCD panel with large scale, high quality, and high resolution is on the trend to display more images and contents simultaneously for the users. Because the LCD images and contents are displayed on the panel more and more, a single display panel rarely meets the needs of the users for more contents and images at the same time. Therefore, the double-side technology of the related art is an LCD panel combined with an electronic paper screen, allowing the users to watch different contents of two images on the LCD panel and the electronic paper screen simultaneously. However, an image shown on the electronic paper screen of the related art are much poorer than an image shown on an LCD panel in color, reaction rate, and other technical aspects, so the electronic paper screen of double-side the related art fails to meet the users' requirements for image quality and switch fluency. Therefore, to propose a new LCD technique to meet user requirements for image quality and display speed is a solution to the drawbacks of the related art.

SUMMARY

To solve the problems of the related art as mentioned above, the object of the present disclosure is to provide a flexible liquid crystal display (LCD) module for double-side display. The flexible LCD module includes two back-to-back flexible display panels. Each of the flexible display panel can be controlled at the same time to display the same image or different images. Moreover, the design of the flexible LCD module can be adapted to different using requirements and situations.

According to the present disclosure, a flexible liquid crystal display (LCD) module for double-side display comprises a flexible substrate, a first blue light emitting diode (LED) set, and a second blue LED set arranged on the flexible substrate. The first blue LED set and the second blue LED set are formed by a plurality of blue LEDs arranged at a predetermined pitch. The first blue LED set and the second blue LED are arranged on two opposite surfaces of the flexible substrate. Each of the plurality of the blue LEDs in the first blue LED set and the second blue LED set is electrically connected to the flexible substrate. A first yellow phosphor layer and a second yellow phosphor layer are arranged on the first blue LED set and the second blue LED set, respectively. A first flexible LCD panel and a second flexible LCD panel are combined with the flexible substrate through a first fixing material and a second fixing material, respectively. The first flexible LCD panel comprises a first lower polarizer, a first thin film transistor (TFT) layer, a first color filter, and a first upper polarizer sequentially arranged on a side of the first flexible LCD panel which is bonded with the flexible substrate in a direction away from the flexible substrate. The first upper polarizer, the first color filter, the first TFT layer, and the first lower polarizer are all fabricated by flexible material. The second flexible LCD panel comprises a second lower polarizer, a second TFT layer, a second color filter, and a second upper polarizer sequentially arranged on a side of the second flexible LCD panel which is bonded with the flexible substrate in a direction away from the flexible substrate. The second upper polarizer, the second color filter, the second TFT layer, and the second lower polarizer are all fabricated by flexible material.

According to one embodiment of the flexible LCD module, the flexible substrate is fabricated by opaque material.

According to one embodiment of the flexible LCD module, the flexible substrate is a flexible printed board (FPC).

According to one embodiment of the flexible LCD module, the predetermined pitch at which the blue LEDs are arranged is designed to have the same pitch between the adjacent blue LEDs.

According to one embodiment of the flexible LCD module, the predetermined pitch at which the blue LEDs are arranged is designed to have two or more different pitches between the adjacent blue LEDs.

According to one embodiment of the flexible LCD module, the first fixing material and the second fixing material are both attached onto the first yellow phosphor layer and the second yellow phosphor layer so that the first flexible LCD panel and the second flexible LCD panel are both combined with the flexible substrate.

According to one embodiment of the flexible LCD module, the first yellow phosphor layer and the second yellow phosphor layer are disposed optionally directly on a blue LED or a plurality of blue LEDs of the first blue LED set and the second blue LED set.

According to one embodiment of the flexible LCD module, the first fixing material and the second fixing material are attached to the edge of the flexible substrate so that the first flexible LCD panel and the second flexible LCD panel are firmly attached to the flexible substrate, respectively.

According to one embodiment of the flexible LCD module, the first upper polarizer, the first color filter, the first TFT layer, and the first lower polarizer on the first flexible LCD panel are all fabricated by polyimide (PI) material; the second upper polarizer, the second color filter, the second TFT layer, and the second lower polarizer on the second flexible LCD panel are all fabricated by the PI material.

According to one embodiment of the flexible LCD module, the first fixing material and the second fixing material are both the material of a foam tape.

Compared to the related art, the present embodiment discloses a flexible double-side LCD module provided with two back-to-back flexible display panels. Each of the flexible display panels can be controlled to display the same image or different images at the same time. The design of the flexible LCD module can be adapted to different using requirements and situations. Therefore, the flexible LCD module for double-side display can be more widely applied, which improves the user experience of the product, thereby increasing the market competitiveness of products.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a cross-sectional diagram illustrating a liquid crystal display (LCD) module for double-side display according to an embodiment of the present disclosure.

DETAILED DESCRIPTION OF THE EMBODIMENTS

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

FIG. 1 is a cross-sectional diagram illustrating a liquid crystal display (LCD) module 10 for double-side display according to an embodiment of the present disclosure. As FIG. 1 illustrates, the LCD module 10 for double-side display includes a flexible substrate 12, a first blue light emitting diode (LED) set 14, a second blue LED set 15, a first yellow phosphor layer 16, a second yellow phosphor layer 17, a first flexible LCD panel 30, and a second flexible LCD panel 50.

The flexible substrate 12 may be a flexible printed circuit (FPC). The first blue LED set 14 and the second blue LED set 15 are formed by a plurality of blue LEDs arranged at a predetermined pitch. The predetermined pitch may be designed to have the same pitch or different pitches between adjacent blue LEDs to meet the application requirements of different products. If the predetermined pitch is designed to have different pitches between adjacent blue LEDs, two or more kinds or two kinds of the different pitches are adopted. The first blue LED set 14 and the second blue LED set 15 are arranged on the two opposite surfaces of the flexible substrate 12. Besides, each of the blue LEDs in the first blue LED set 14 and the second blue LED set 15 is electrically connected to the flexible substrate 12. The flexible substrate 12 may be fabricated by opaque material to avoid an image shown on one of the two flexible LCD panels from affected by an image shown the other one of the flexible LCD panels, and vice versa.

The first yellow phosphor layer 16 and the second yellow phosphor layer 17 are arranged on the first blue LED set 14 and the second blue LED set 15, respectively. When the blue LED in the first set 14 emits light, the first yellow phosphor layer 16 is excited and then a synthetic white light is emitted. The synthetic white light serves as backlight of the first flexible LCD panel 30. Similarly, the second blue LED set 15 and the second yellow phosphor layer 17 matches and then a synthetic white light is emitted. The synthetic white light serves as backlight of the second flexible LCD panel 50. The first yellow phosphor layer 16 and the second yellow phosphor layer 17 may be disposed optionally directly on a blue LED or a plurality of blue LEDs of the first blue LED set 14 and on a blue LED or a plurality of blue LEDs of the second blue LED set 15, which also shows the effect that the yellow phosphor layer is exited to emit white light when the blue LED emits light.

At the side of the flexible substrate 12 where the first yellow phosphor layer 16 is arranged, the first flexible LCD panel 30 is attached onto the first yellow phosphor layer 16 through the first fixing material 22 in combination with the flexible substrate 12. At the side of the flexible substrate 12 where the second yellow phosphor layer 17 is arranged, the second flexible LCD panel 50 is attached onto the second yellow phosphor layer 17 through the second fixing material 24 in combination with the flexible substrate 12. The first fixing material 22 and the second fixing material 24 may be material like a foam tape or other similar fixing material. If the first yellow phosphor layer 16 and the second layer 17 are disposed directly on a blue LED or a plurality of blue LEDs of the first blue LED set 14 and on a blue LED or a plurality of blue LEDs of the second blue LED set 15, the first fixing material 22 and the second fixing material 24 may be directly attached to the edge of the flexible substrate 12 so that the first flexible LCD panel 30 and the second flexible LCD panel 50 are firmly attached to the flexible substrate 12 through the first fixing material 22 and the second fixing material 24, respectively.

A first lower polarizer 38, a first thin film transistor (TFT) layer 32, a first color filter 34, and a first upper polarizer 36 are sequentially arranged on the side of the first flexible LCD panel 30 where the first yellow phosphor layer 16 is bonded in a direction away from the flexible substrate 12. A second lower polarizer 58, a second TFT layer 52, a second color filter 54, and a second upper polarizer 56 are sequentially arranged on the side of the second flexible LCD panel 50 where the second yellow phosphor layer 17 is bonded in a direction away from the flexible substrate 12. The first upper polarizer 36, the first color filter 34, the first TFT layer 32, and the first lower polarizer 38 on the first flexible LCD panel 30 are all fabricated by flexible material such as polyimide (PI). The second upper polarizer 56, the second color filter 54, the second TFT layer 52, and the second lower polarizer 58 on the second flexible LCD panel 50 are all fabricated by flexible material as well.

The present embodiment discloses a flexible double-side LCD module provided with two back-to-back flexible display panels. Each of the flexible display panels can be controlled to display the same image or different images at the same time. The design of the flexible LCD module can be adapted to different using requirements and situations. Therefore, the flexible LCD module for double-side display can be more widely applied, which improves the user experience of the product, thereby increasing the market competitiveness of products.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A flexible liquid crystal display (LCD) module for double-side display, comprising:
   a flexible substrate;
   a first blue light emitting diode (LED) set and a second blue LED set, arranged on the flexible substrate; the first blue LED set and the second blue LED set being formed by a plurality of blue LEDs arranged at a predetermined pitch; the first blue LED set and the second blue LED being arranged on two opposite surfaces of the flexible substrate; each of the plurality of the blue LEDs in the first blue LED set and the second blue LED set being electrically connected to the flexible substrate;

a first yellow phosphor layer and a second yellow phosphor layer, arranged on the first blue LED set and the second blue LED set, respectively; and a first flexible LCD panel and a second flexible LCD panel are combined with the flexible substrate through a first fixing material and a second fixing material, respectively;

wherein the first flexible LCD panel comprises a first lower polarizer, a first thin film transistor (TFT) layer, a first color filter, and a first upper polarizer sequentially arranged on a side of the first flexible LCD panel which is bonded with the flexible substrate in a direction away from the flexible substrate; the first upper polarizer, the first color filter, the first TFT layer, and the first lower polarizer are all fabricated by flexible material;

the second flexible LCD panel comprises a second lower polarizer, a second TFT layer, a second color filter, and a second upper polarizer sequentially arranged on a side of the second flexible LCD panel which is bonded with the flexible substrate in a direction away from the flexible substrate; the second upper polarizer, the second color filter, the second TFT layer, and the second lower polarizer are all fabricated by flexible material;

wherein the first fixing material is applied onto a surface of the first yellow phosphor layer and a surface of the first lower polarizer such that the surface of the first yellow phosphor layer and the surface of the first lower polarizer are face-to-face fixed with each other; and the second fixing material is applied onto a surface of the second yellow phosphor layer and a surface of the second lower polarizer such that the surface of the second yellow phosphor layer and the surface of the second lower polarizer are face-to-face fixed with each other.

2. The flexible LCD module of claim 1, wherein the flexible substrate is fabricated by opaque material.

3. The flexible LCD module of claim 1, wherein the flexible substrate is a flexible printed board (FPC).

4. The flexible LCD module of claim 1, wherein the predetermined pitch at which the blue LEDs are arranged is designed to have the same pitch between the adjacent blue LEDs.

5. The flexible LCD module of claim 1, wherein the predetermined pitch at which the blue LEDs are arranged is designed to have two or more different pitches between the adjacent blue LEDs.

6. The flexible LCD module of claim 1, wherein the first yellow phosphor layer and the second yellow phosphor layer are disposed optionally directly on a blue LED or a plurality of blue LEDs of the first blue LED set and the second blue LED set.

7. The flexible LCD module of claim 6, wherein the first fixing material and the second fixing material are attached to the edge of the flexible substrate so that the first flexible LCD panel and the second flexible LCD panel are firmly attached to the flexible substrate, respectively.

8. The flexible LCD module of claim 1, wherein the first upper polarizer, the first color filter, the first TFT layer, and the first lower polarizer on the first flexible LCD panel are all fabricated by polyimide (PI) material; the second upper polarizer, the second color filter, the second TFT layer, and the second lower polarizer on the second flexible LCD panel are all fabricated by the PI material.

9. The flexible LCD module of claim 1, wherein the first fixing material and the second fixing material are both the material of a foam tape.

* * * * *